(12) United States Patent
Stewart

(10) Patent No.: US 6,192,595 B1
(45) Date of Patent: Feb. 27, 2001

(54) GAUGE FOR USE WITH AN INSTRUMENT FOR MEASURING THE PITCH OF AN OAR BLADE

(76) Inventor: Michael S. Stewart, 319 University Avenue, Fredericton, New Brunswick (CA), E3B 4H9

(*) Notice: Subject to any disclaimer, the term of this patent is extended or adjusted under 35 U.S.C. 154(b) by 0 days.

(21) Appl. No.: 09/282,367

(22) Filed: Mar. 31, 1999

(51) Int. Cl.⁷ .................................................. G01B 5/00
(52) U.S. Cl. .............................................. 33/530; 33/552
(58) Field of Search ................................. 33/530, 562, 370, 33/371, 372, 391, 1 N, 534, 538, 376, 402

(56) References Cited

U.S. PATENT DOCUMENTS

| | | | |
|---|---|---|---|
| 2,072,779 | * | 3/1937 | Torbert, Jr. ................... 33/371 |
| 2,170,824 | * | 8/1939 | Lichtenwalner ................ 33/371 |
| 2,737,722 | | 3/1956 | Keim ............................. 33/46 |
| 3,148,454 | * | 9/1964 | Anderson ....................... 33/534 |
| 3,464,119 | * | 9/1969 | Griggs ........................... 33/552 |
| 4,188,729 | * | 2/1980 | Peterson ........................ 33/332 |
| 4,411,214 | | 10/1983 | Horiuchi ........................ 114/347 |
| 4,492,029 | * | 1/1985 | Tanaka et al. ................. 33/366 |
| 4,662,849 | | 5/1987 | Loerch .......................... 440/107 |
| 4,669,195 | * | 6/1987 | Griffin .......................... 33/339 |
| 4,718,172 | * | 1/1988 | Rouse et al. .................. 33/530 |
| 4,760,649 | * | 8/1988 | Preston et al. ................ 33/333 |
| 4,771,546 | * | 9/1988 | Cavazos ....................... 33/402 |
| 5,324,218 | | 6/1994 | Rijnders ....................... 440/107 |
| 5,345,688 | | 9/1994 | Allen ............................ 33/535 |
| 5,574,442 | * | 11/1996 | Kinoshita et al. ............. 340/870.38 |

* cited by examiner

Primary Examiner—Christopher W. Fulton
Assistant Examiner—Maria Fernandez
(74) Attorney, Agent, or Firm—Mario Theriault

(57) ABSTRACT

The gauge has a first template-like cavity and a first straight edge bordering the first cavity. The first template-like cavity is adapted to enclose an end of an oar blade, and the straight edge is usable for steadying a pitch meter against the oar blade for measuring a pitch angle on the oar blade. In another aspect of the invention the gauge has first and second template-like symmetrical cavities separated from each other by a pendulum member that is movable from side to side to selectively define a template-like trapezoidal shape inside either cavities for selectively gauging a competition-type oar blade on a starboard or on a port side of a racing shell.

20 Claims, 4 Drawing Sheets

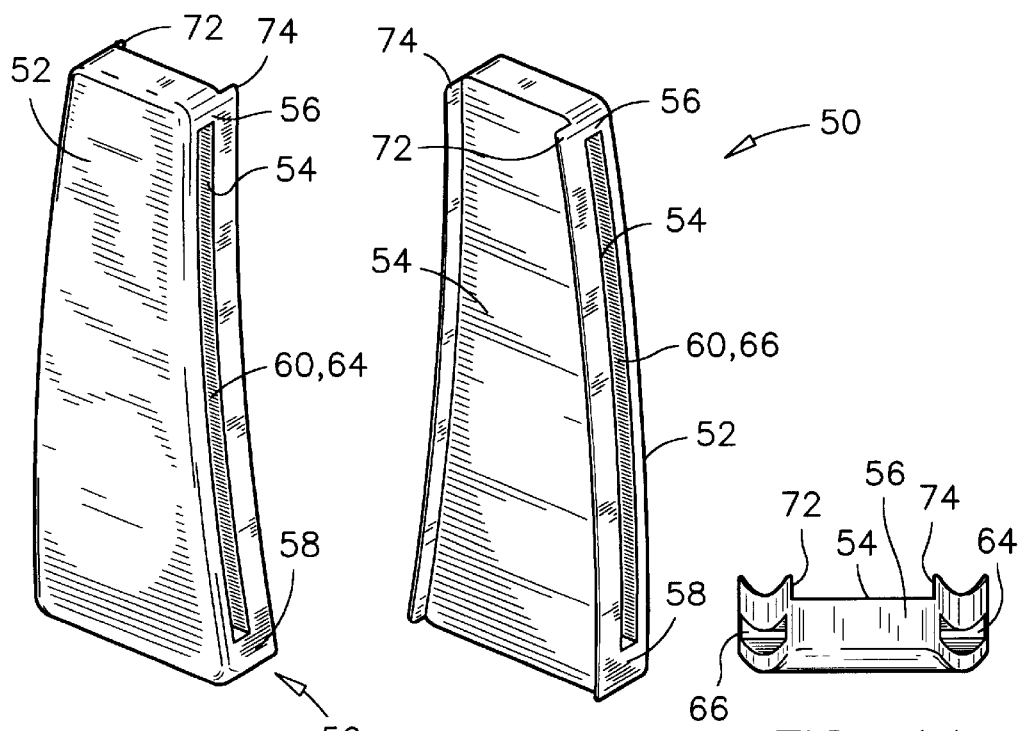
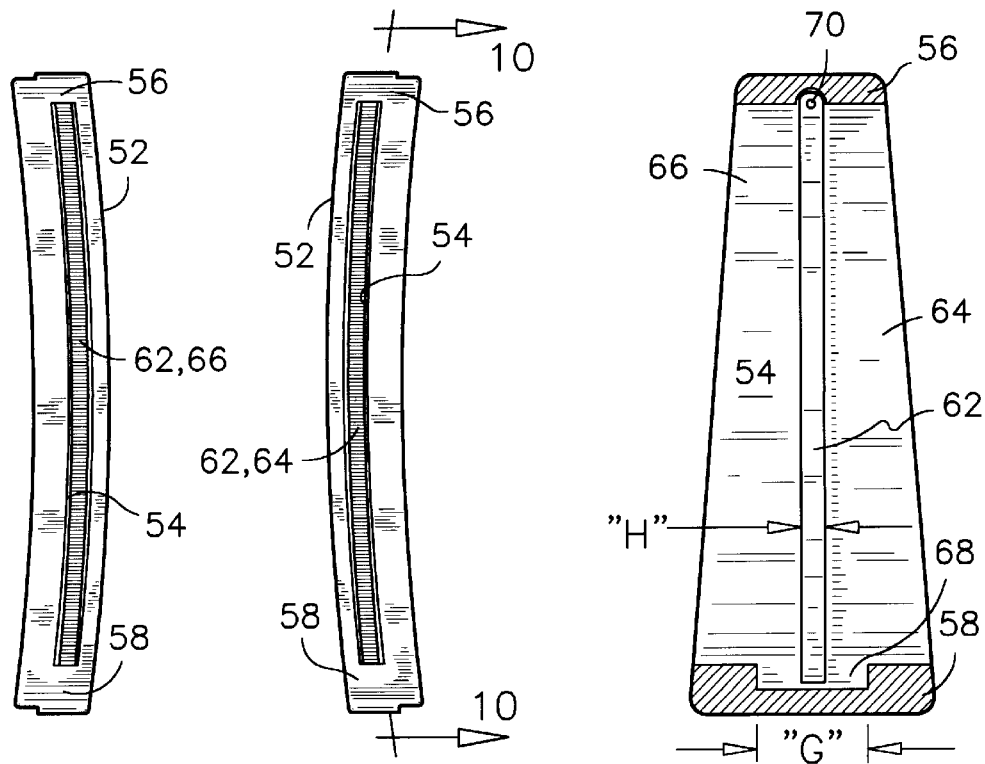

GAUGE FOR USE WITH AN INSTRUMENT FOR MEASURING THE PITCH OF AN OAR BLADE

FIELD OF THE INVENTION

This invention pertains to squares and squaring jigs, and more particularly, it pertains to a squaring gauge for use with a pitch meter for measuring the pitch angle of an oar blade.

BACKGROUND OF THE INVENTION

In regattas, the athletes, or rowers, are the most important elements in getting a boat to go fast. Their strength, endurance, and technique contribute to performance more than anything else. The equipment and rigging of a boat also contribute to a great extent to boat speed.

In regard to rigging, the proper adjustment of the pitch angle of an oar blade, for example, is known to provide a smooth entry and exit of the oar blade from the water, and to exert a more efficient propulsion during the drive segment of the oar stroke. Therefore, the pitch angle of an oar blade is normally carefully measured before every race and is adjusted if needed to satisfy the preferences of each athlete.

Generally, the pitch angle of an oar blade is measured with a pitch meter, or an angle measuring instrument, that is held against the surface of the blade. During this procedure, it is recommended to place the pitch meter at right angle with the longitudinal axis of the oar in order to obtain a consistent measurement of the pitch angle of the oar blade.

There is no known squaring device in the prior art for use with a pitch meter of the type used to measure the pitch angle of an oar blade, for holding the pitch meter at right angle with the oar shaft. Therefore, this measurement is usually done by visually positioning and approximately holding the instrument on the oar blade as best as one can. When the adjustment is done inattentively, or by a person having insufficient training, the setting may vary from one oar to the next, or between two oars in a same pair, causing too much floating or sinking of the blade and uneven pull on the oars. This reason basically has contributed to the development of a market demand for a squaring gauge capable of steadying a pitch meter on an oar blade at right angle with the oar shaft.

SUMMARY OF THE INVENTION

In the present invention, there is provided a gauge that is mountable on an oar and that has at least one straight edge on which a pitch meter can be steadied for precisely and consistently measuring the pitch angle of the oar blade.

Broadly, in accordance with one feature of the present invention, there is provided a gauge having a first template-like cavity therein and a first straight edge bordering the first cavity. The first template-like cavity is adapted to enclose an end of an oar blade and the first straight edge is usable for steadying a pitch meter against the oar blade.

A first advantage of the gauge of the present invention, is that when it is used with a pitch meter for successively measuring the pitch angles of several oar blades of a same type, on a same boat for example, the measurements taken are precise and consistent from one oar blade to the next.

In a further feature of the present invention the template-like cavity has an oar-blade-like cross-section, such that it fits precisely over an oar blade to be measured.

In accordance with another feature of the present invention there is provided a gauge having a first template-like cavity therein and a first straight edge bordering the first cavity. The gauge further has a median region, a second template-like cavity disposed besides the first cavity and being separated from the first cavity by the median region, and a second straight edge bordering the second cavity. The first and second template-like cavities are symmetrical to each other relative to the median region. The first and second straight edges are also symmetrical to each other relative to the median region. The first and second cavities are thereby usable for selectively gauging an oar blade on a starboard side or on a port side of a racing shell, by simply manipulating the gauge from side-to-side.

In yet another aspect of the present invention, there is provided a gauge for use with a pitch measuring instrument, for measuring a pitch angle of an oar blade. This gauge comprises a first and second spaced-apart parallel walls each having finite length and width dimensions and respective first and second ends. First and second header members respectively join the first and second ends. An oblong slot is defined between the first and second walls and the first and second header members. The oblong slot has a thickness dimension and shares a substantial portion of the aforesaid length and width dimensions. The oblong slot also has a median region along the width dimension.

There is also provided a pendulum member having a first and second extremities, the first extremity being pivotally mounted to the first header member inside the oblong slot, for pivotal pendulum movement thereof along the oblong slot and over the median region. The pendulum member has a slender shape and a measure relatable to the thickness dimension of the oblong slot for dividing the oblong slot into a first and second juxtaposed template-like cavities.

The second header member has a notch therein for loosely enclosing the second extremity of the pendulum member. The notch has a first and second shoulders and a calibrated dimension between the first and second shoulders. The first and second shoulders are equally spaced from the median region.

The pendulum member is selectively movable against the first or second shoulder for selectively defining symmetrical calibrated shapes of the first and second template-like cavities for selectively gauging an oar blade on a starboard side, or on a port side of a racing shell when one of the cavities is adapted to be fitted over any oar blade in a set of oars.

According to yet another feature of the present invention, each of the symmetrical calibrated template-like cavities mentioned above has a trapezoidal shape to conform to the contour of a hatchet-type oar blade.

Still another feature of the present invention is that this gauge is susceptible of a low cost of manufacture with regards to both materials and labour, and which accordingly is then susceptible of low prices of sale to the consumer, thereby making such gauge economically available to the public.

BRIEF DESCRIPTION OF THE DRAWINGS

One embodiment of this invention is illustrated in the accompanying drawings, in which like numerals denote like parts throughout the several views, and in which:

FIG. 7A is a top, front and right side perspective view of the gauge according to the preferred embodiment of the present invention;

FIG. 7B is a top, rear and left side perspective view of the gauge according to the preferred embodiment;

FIG. 8 is a left side view of the gauge;

FIG. 9 is a right side view of the gauge;

FIG. 10 is a cross-section view of the gauge according to the preferred embodiment, as seen along line 10—10 in FIG. 9;

FIG. 11 is a top view of the gauge;

DETAILED DESCRIPTION OF THE PREFERRED EMBODIMENT

Referring particularly to FIGS. 1–6, these illustrations are presented herein to briefly explain a typical method for adjusting the pitch angle of an oar blade, such that one can better appreciate the advantages of the squaring gauge of the present invention. For convenience, the gauge according to the preferred embodiment of the present invention is often referred to hereinafter as the pitch gauge.

Figure 1:
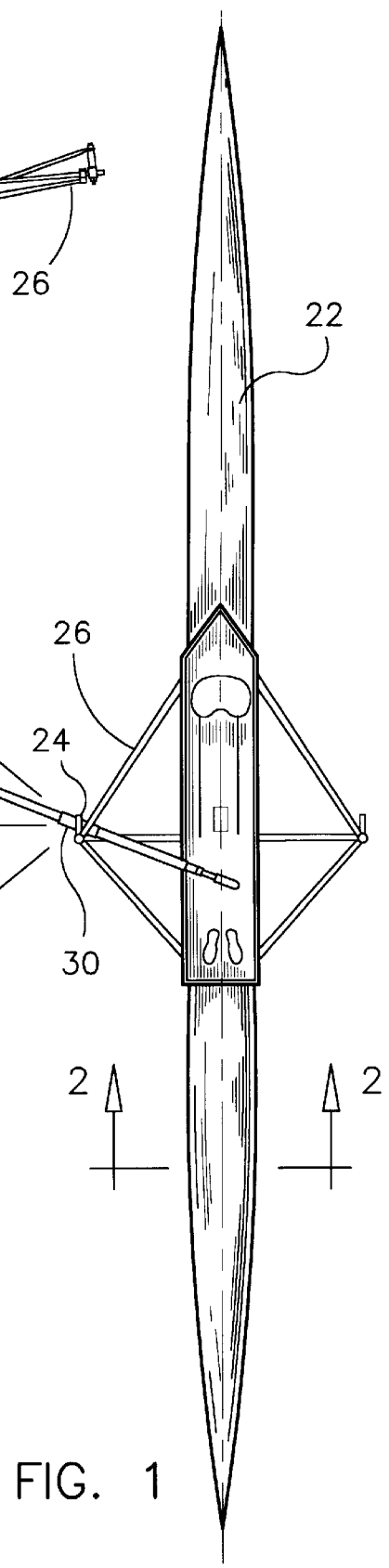
FIG. 1 is a plan view of a typical racing boat or racing shell.

The pitch angle of the blade of an oar 20 on a single-person racing shell 22 for example, is adjusted at the catch position "A", at the drive position "B" and at the release position "C" as shown in FIG. 1. The pitch angle is represented by label "D" in FIG. 3. Common values for pitch angles are for example, 4°–6° at "A"; 4° at "B", and 3°–4° at "C". This adjustment is normally effected at the oarlock 24 and at the mounting of the oarlock 24 to the rigging 26 of the shell 22.

A positioning sleeve 30 is normally provided on an oar shaft for engagement inside an oarlock 24. This sleeve has a flat portion for engagement on a pressure bearing surface of the oarlock. The pitch angle of the oar blade is adjustable by changing or moving a shim plate 32 on the pressure bearing surface of the oarlock, or by changing a set of eccentric bushings 34 on the mounting axis 36 of the oarlock.

In other cases, the position of the oarlock 24 relative to the rigging 26 is also adjustable by means of slots and telescoping members (not shown) on the rigging itself for obtaining the optimum pitch angle "D" at the above-mentioned positions.

Figure 2:
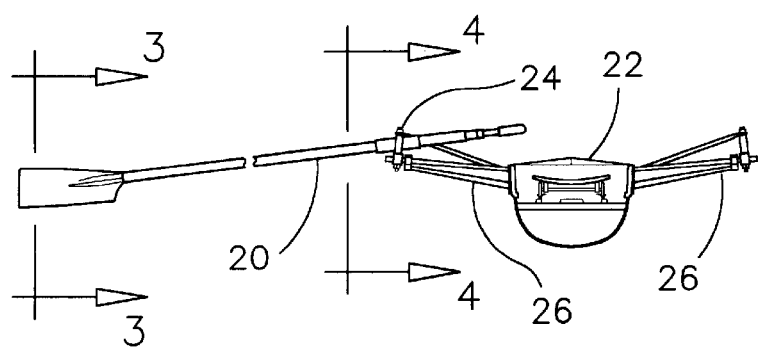
FIG. 2 is a transversal cross-section view of the typical racing shell as seen along line 2—2 in FIG. 1.
Figure 3:
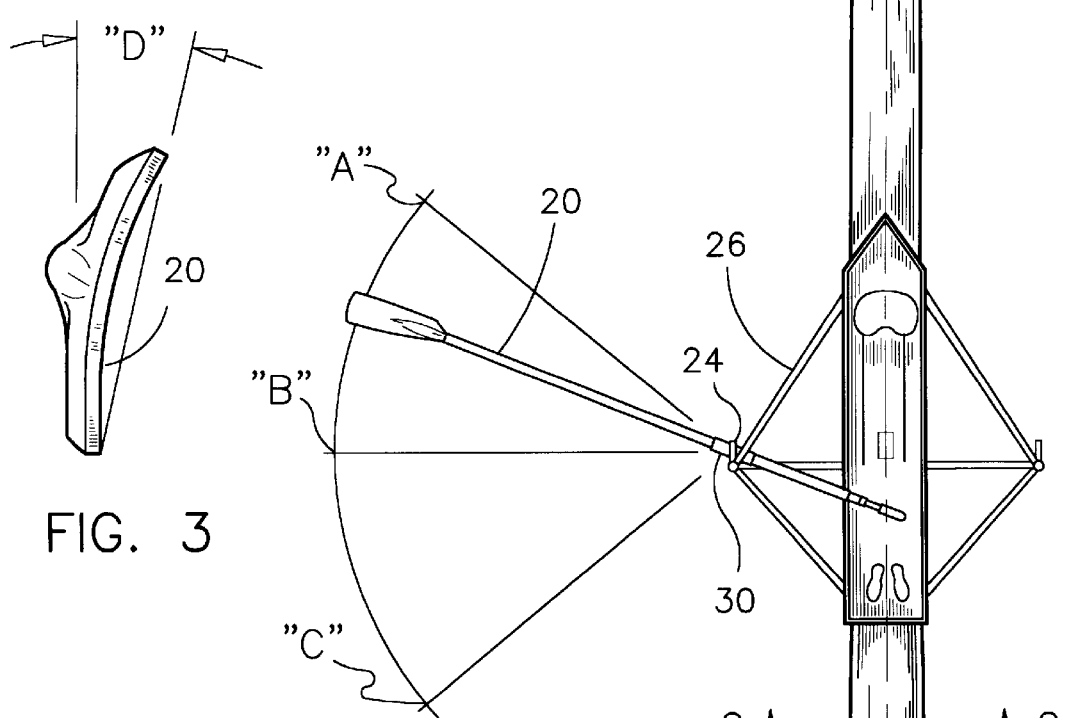
FIG. 3 is a cross-section view of an oar blade as seen along line 3—3 in FIG. 2.
Figure 4:
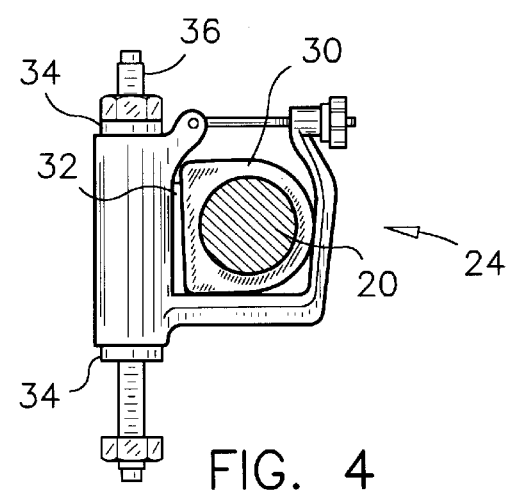
FIG. 4 is a cross-section view of an oar shaft and a side view of an oarlock, as seen along line 4—4 in FIG. 2.
Figure 5:
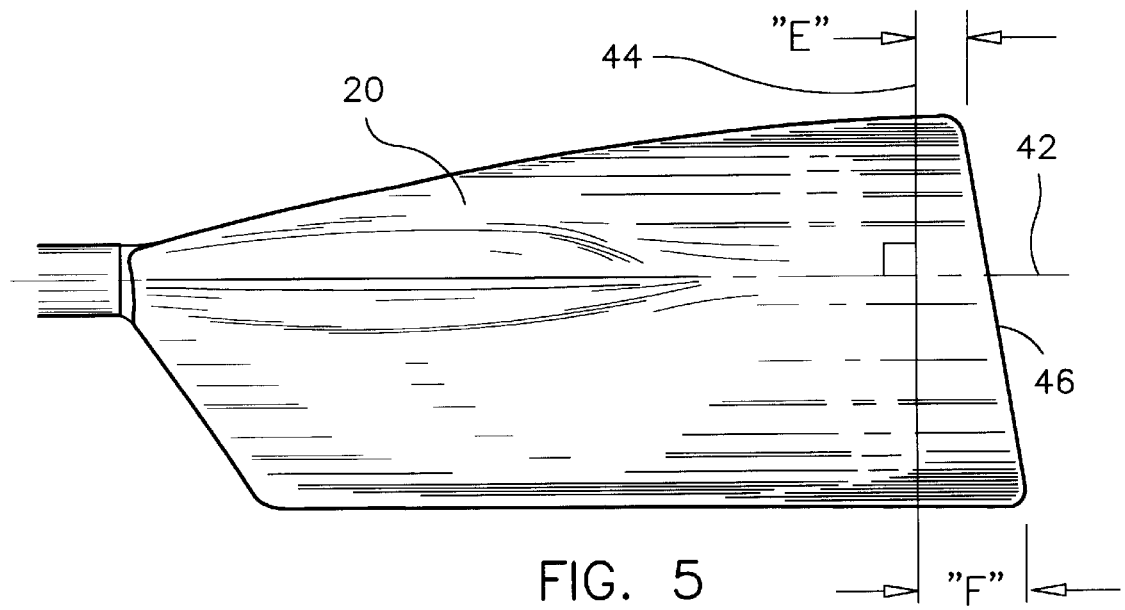
FIG. 5 is a side view of a typical oar blade, often referred to as a big blade, or a hatchet-type blade.
Figure 6:
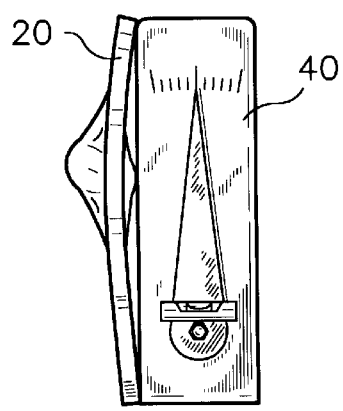
FIG. 6 is an end view of an oar blade with a pitch meter held against the blade during the measurement of the pitch angle of the blade.

Referring now to FIGS. 3, 5 and 6, the pitch angle "D" is measured by conventional rule, with a pitch measuring instrument, often referred to as a pitch meter 40 along a reference line oriented at 90° from the longitudinal axis 42 of the oar. This reference line is represented by line 44 in FIG. 5. It will be appreciated that when the oar blade is painted and decorated with the colours of the rowing team, it can be difficult to define a reference line 44 which is perpendicular to the longitudinal axis of the oar 20. Moreover, the competition oars generally do not have a square drive end 46. The dimensions "E" and "F" from a reference square line 44, on a small hatchet type oar blade are 1 inch and 2⅜ inches respectively for example. The dimension "F" on a large hatchet type oar blade could be as much as 2⅞ inches.

Therefore it will be appreciated that it is not possible to use the drive end 46 of the oar blade for placing the pitch meter 40 at right angle with the longitudinal axis 42, or the shaft of the oar.

Referring now to FIGS. 7–11, the pitch gauge 50 of the preferred embodiment is illustrated therein in its entirety. The pitch gauge of the preferred embodiment comprises a first and second spaced apart parallel walls 52,54 joined at a first and second ends thereof by a first and second header members 56,58. The first and second walls 52,54 and the first and second header members 56,58, jointly define a substantially curved oblong slot 60, extending along the width of each wall. The curvature of each wall, and of the oblong slot 60 defined there-between as illustrated in FIGS. 8 and 9, is a same curvature as the cross-section of an oar blade to be adjusted, such that the slot 60 fits over the end of a specific type and make of oar blade.

In the pitch gauge 50 of the preferred embodiment, there is further provided, a pendulum member, or a cavity dividing member 62 which is pivotally mounted to the first header member 56, and which is adapted for pendulum movement along and inside the slot 60, over a median region of the slot. The pendulum member 62 has a nominal thickness and divides the slot 60 into right and left symmetrical template-like trapezoidal calibrated shapes 64,66. It provides a common wall to the right and left cavities. The pendulum member 62 further extends into a notch 68 inside the second header member 58. The movement of the pendulum member 62 is restrained within the notch 68. The calibrated dimension "G" of the notch 68 is equivalent to the difference between width dimensions "E", and "F" in FIG. 5, on a particular type of oar blade plus the width "H" of the pendulum member 62.

The pivot attachment 70 of the pendulum member 62 in the first header member 56 is centred along the first header member 56. The notch 68 is centred along the second header member 58.

The pitch gauge 50 according to the preferred embodiment further has a pair of spaced apart raised lips 72,74 extending above the surface of one of the first and second walls 52,54, as illustrated in FIGS. 7A, 7B and 11. The raised lips 72,74 provide guiding edges which are advantageous for placing and steadying a pitch meter 40 when measuring the pitch angle on an oar blade as explained herein below.

Figures 12, 13:
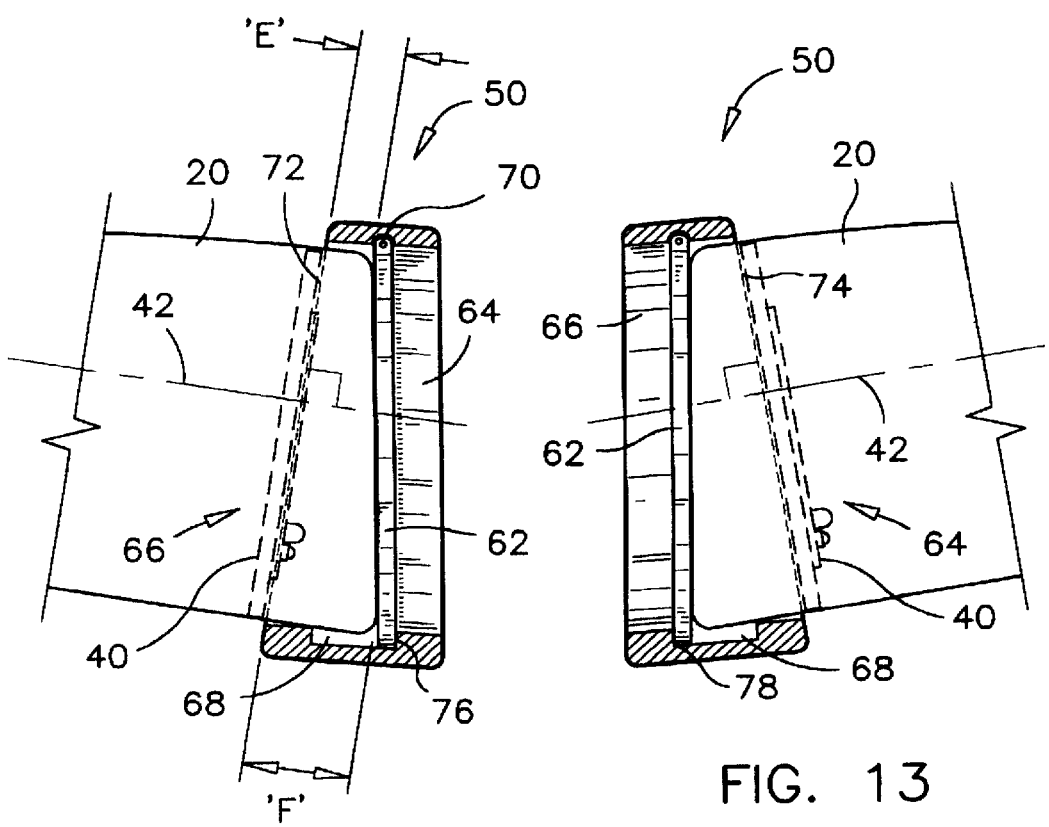
FIG. 12 is a cross-section view of the gauge, similar to the view in FIG. 10 but shown as being mounted on an oar blade on a starboard side of a boat.
FIG. 13 is a cross-section view of the gauge, similar to the view in FIG. 10, but shown as being mounted on an oar blade on a port side of a boat.

Referring now to FIGS. 12 and 13, a best mode of operation of the pitch gauge 50 according to the preferred embodiment is illustrated therein. When adjusting the pitch angle of an oar blade on a starboard side of a racing shell as illustrated in FIG. 12, the pitch gauge 50 according to the preferred embodiment is placed over the end of the oar blade 20 by sliding the left cavity 66 over the end of the blade until the pendulum member 62 abuts against the end of the blade and against the right side 76 of the notch 68. When the pitch gauge 50 is in this position, the left lip 72, as illustrated in dash lines in FIG. 12, defines a right angle with the longitudinal axis 42 of the oar 20.

When the pitch gauge 50 is fitted over an oar blade on a port side of the shell 22, as illustrated in FIG. 13, with the pendulum member 62 shifted against the left shoulder 78 of the notch 68, the right lip 74, as illustrated in dash lines defines a right angle with the longitudinal axis 42 of that oar.

For reference purposes, it will be appreciated that the dimensions "E" and "F" in FIG. 5 are respectively about the same as the first and second unequal width dimensions of the left cavity 66, measured from the left lip 72 and along the opposite edges of the left cavity, as shown in FIG. 12, when the pendulum member 62 is moved against the right shoulder 76. Referring to FIG. 13, the right cavity 64 and the right lip 74 are symmetrical to the left cavity 66 and the left lip 72, relative to the median region of the pitch gauge, when the pendulum member 62 is moved against the left shoulder 78.

The pitch measuring instrument 40 can then be conveniently placed against the lip 72 or lip 74 for accurately measuring the pitch angle of an oar blade. Therefore, the single pitch gauge according to the preferred embodiment is usable for measuring the pitch angle on the oars on both sides of a racing shell.

As to the manner of manufacturing the present invention, the same should be apparent from the above description, and accordingly no further discussion relative to this aspect is provided.

While one embodiment of the present invention has been illustrated in the accompanying drawings and described herein above, it will be appreciated by those skilled in the art that various modifications, alternate constructions and equivalents may be employed without departing from the true spirit and scope of the invention. Therefore, the above description and the illustrations should not be construed as limiting the scope of the invention which is defined by the appended claims.

I claim:

1. A gauge for use with a pitch meter for measuring a pitch angle on an oar blade, said gauge having:
    a first template-like cavity therein and a first straight lip bordering said first template-like cavity;
    said first template-like cavity having along opposite edges thereof, a first and second unequal width dimensions measured from said first straight lip;
    a second template-like cavity therein and a second straight lip bordering said second template-like cavity;
    said second template-like cavity having along opposite edges thereof, said first and second unequal width dimensions measured from said second straight lip;
    a median region between said first and second template-like cavities;
    an oblong slot encompassing said first and second template-like cavities;
    a pendulum member having a movable end and a cross-section dimension and being pivotally mounted inside said oblong slot for pendulum movement along said oblong slot and over said median region;
    a notch formed inside said oblong slot and loosely enclosing said movable end of said pendulum member; said notch having a first and second shoulders and a calibrated dimension between said first and second shoulders; said first and second shoulders being equally spaced from said median region;
    said calibrated dimension being equal to a difference between said first and second unequal width dimensions plus said cross-section dimension of said pendulum member;
    said pendulum member being selectively movable against said first or second shoulders and selectively defining symmetrical calibrated shapes of said first and second template-like cavities
    such that said first and second template-like cavities are usable for selectively gauging an oar blade on a starboard side or on a port side of a racing shell, and said first and second straight edges are usable for steadying a pitch meter against said oar blade.

2. The gauge as claimed in claim 1, wherein each of said template-like cavities has an oar-blade-like cross-section.

3. The gauge as claimed in claim 1, wherein said first and second template-like cavities are contiguous with each other.

4. The gauge as claimed in claim 3, wherein each of said first and second template-like cavities has a trapezoidal shape.

5. The gauge as claimed in claim 3, wherein said first and second straight edges are also symmetrical to each other relative to said median region.

6. The gauge as claimed in claim 1, wherein said oblong slot is a curved slot having an oar-blade-like cross-section.

7. The gauge as claimed in claim 1, wherein said pendulum member has an upper end opposite said movable end and a pivot through said upper end and sad oblong slot.

8. The gauge as claimed in claim 7, wherein said pendulum member defines a common wall of said first and second template-like cavities.

9. A gauge for use with a pitch measuring instrument, for measuring a pitch angle on an oar blade, said gauge comprising:
    a first and second spaced-apart parallel walls each having respective first and second ends;
    a first and second header members respectively joining said first and second ends;
    an oblong slot defined between said first and second walls and said first and second header members; said oblong slot having a thickness dimension and a median region extending between said first and second header members; and
    a pendulum member having a first and second extremities and a cross-section dimension, said first extremity being pivotally mounted to said first header member inside said oblong slot and along said median region for pivotal pendulum movement thereof along said oblong slot;
    said pendulum member also having means for dividing said oblong slot into a first and second juxtaposed oblong template-like cavities each of which having a first and second unequal width dimensions measured along said first and second header members respectively;
    said second header member having a notch therein loosely enclosing said second extremity of said pendulum member; said notch having a first and second shoulders and a calibrated dimension between said first and second shoulders; said first and second shoulders being equally spaced from said median region; said calibrated dimension being equal to a difference between said first and second unequal width dimensions plus said cross-section dimension of said pendulum member;
    said pendulum member being selectively movable against said first or second shoulders and selectively defining symmetrical calibrated shapes of said first and second template-like cavities;
    such that said first and second template-like cavities are usable for selectively gauging an oar blade on a starboard side or on a port side of a racing shell when one of said template-like cavities is adapted to be fitted over an oar blade in a set of oars.

10. The gauge as claimed in claim 9, wherein said oblong slot is a curved slot having an oar-blade-like cross-section.

11. The gauge as claimed in claim 9, wherein said calibrated shapes are trapezoidal.

12. The gauge as claimed in claim 9, further having a first and second lips respectively bordering said first and second template-like cavities.

13. The gauge as claimed in claim 12, wherein said lips are raised from one of said first and second walls.

14. The gauge as claimed in claim 13, wherein said first and second lips are symmetrical to each other relative to said median region.

15. A combination of an oar blade and a pitch gauge mounted on an end of said oar blade for use with a pitch meter for measuring a pitch angle on said oar blade, said pitch gauge having:
- a first template-like cavity therein and said first template-like cavity having an outline and dimensions similar to a cross-section of said oar blade for precisely enclosing said end of said oar blade;
- a first straight edge bordering said first template-like cavity;
- a second template-like cavity therein being symmetrical to said first template-like cavity;
- a second straight edge bordering said second template-like cavity;
- one of said first and second straight edges making a right angle with a longitudinal axis of said oar blade;
- a median region between said first and second template-like cavities; and
- a pendulum member movably mounted along said median region and defining a common wall between said first and second template-like cavities;

such that said first and second template-like cavities are usable for gauging said oar blade whether said oar blade is installed on a starboard side or on a port side of a racing shell, and one of said first and second straight edges is usable for steadying a pitch meter along said right angle.

16. The combination as claimed in claim 15, wherein said first and second template-like cavities are symmetrical to each other relative to said median region.

17. The combination as claimed in claim 16, further comprising an oblong slot encompassing said first and second template-like cavities.

18. The combination as claimed in claim 17, wherein said oblong slot is a curved slot.

19. The combination as claimed in claim 15, wherein said first and second straight edges are symmetrical to each other relative to said median region.

20. The combination as claimed in claim 17, wherein said pendulum member has a first and second extremities;
- said first extremity being pivotally mounted inside said oblong slot for pendulum movement of said pendulum member along said oblong slot and over said median region; and
- said gauge further having a notch across said median region, loosely enclosing said second extremity of said pendulum member; said notch having a first and second shoulders and a calibrated dimension between said first and second shoulders.

* * * * *